United States Patent
Coonradt et al.

[11] 3,720,601
[45] Mar. 13, 1973

[54] HYDROCRACKING PROCESS

[72] Inventors: Harry L. Coonradt, Woodbury; Paul W. Snyder, Jr., Pitman, both of N.J.

[73] Assignee: Mobile Oil Corporation, New York, N.Y.

[22] Filed: July 9, 1969

[21] Appl. No.: 840,280

[52] U.S. Cl. ..................260/111, 208/59, 252/455 Z
[51] Int. Cl. .....C10g 13/02, C10g 37/04, C01b 33/28
[58] Field of Search..............................208/59, 111

[56] References Cited

UNITED STATES PATENTS

| | | | |
|---|---|---|---|
| 3,269,934 | 8/1966 | Hansford | 208/111 |
| 3,459,680 | 8/1969 | Plank et al. | 252/455 |
| 3,597,349 | 8/1971 | Bertolacini et al. | 208/111 |
| 3,620,964 | 11/1971 | Stover et al. | 208/111 |
| 3,424,671 | 1/1969 | Kay | 208/59 |
| 3,427,243 | 2/1969 | Hass et al. | 208/111 |
| 3,554,899 | 1/1971 | Hansford | 208/111 |
| 3,562,144 | 2/1971 | Child et al. | 208/111 |
| 3,184,402 | 5/1965 | Kozlowski et al. | 208/59 |
| 3,304,254 | 2/1967 | Eastwood et al. | 208/111 |

*Primary Examiner*—Delbert E. Gantz
*Assistant Examiner*—G. E. Schmitkons
*Attorney*—Oswald G. Hayes, Andrew L. Gaboriault and Carl D. Farnsworth

[57] ABSTRACT

Selected nitrogen-containing hydrocarbon fractions are hydrocracked to maximize gasoline production. A fraction is hydrocracked severely in the presence of added hydrogen and a hydrocracking catalyst resistant to organic nitrogen compounds. Naphtha is separated from the resultant product, and the remaining liquid product is then hydrocracked in the presence of a hydrocracking catalyst.

6 Claims, 1 Drawing Figure

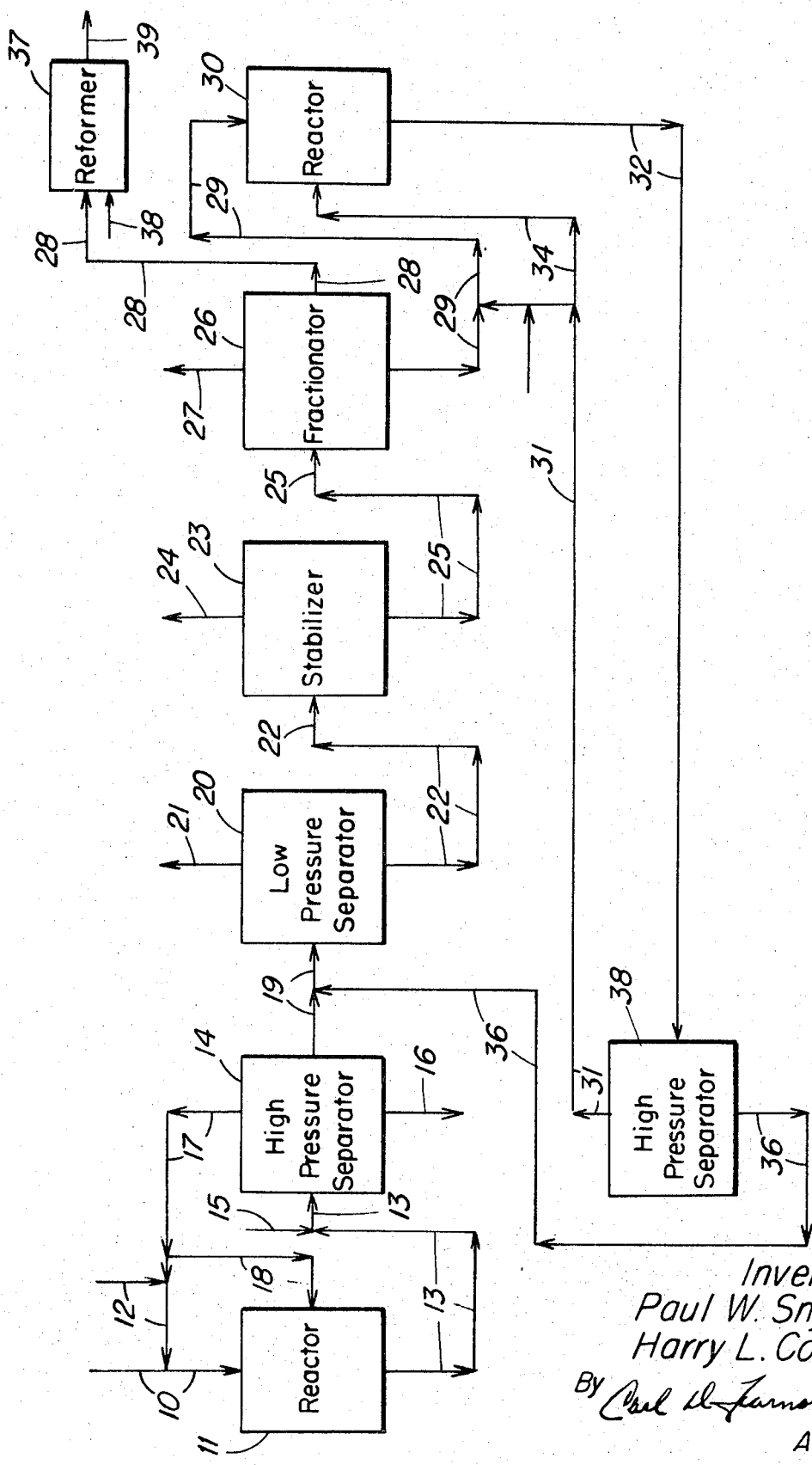

3,720,601

HYDROCRACKING PROCESS

FIELD OF INVENTION

This invention has to do with a multi-stage hydrocracking wherein selected, relatively high nitrogen-content hydrocarbon fractions are converted to gasoline and lower boiling products.

BACKGROUND OF THE INVENTION

Hydrocracking, including multi-stage operation, of hydrocarbon fractions has been known and practiced for many years. However limitations of hydrocracking catalysts have imposed restrictions upon such operations. For example, nitrogen and/or sulfur contaminants in the feed stocks deactivate and age even the most selective hydrocracking catalysts. As a consequence, the first-stage hydrocracking operation has been and is now employed as a pretreating stage (e.g., desulfurization, denitrogenization, etc.) wherein the contaminants are removed with relatively low conversion of feed stock to naphtha, such that the products contain the contaminants in amounts tolerable for the second-stage hydrocracking catalyst. In effect, the first stage is a feed or charge pretreatment, followed by true hydrocracking.

A substantial first-stage conversion of such feed stocks can be accomplished with a number of hydrocracking catalysts, but with unacceptable or undesirably high catalyst aging rates (as measured by a temperature increase per day for uniform effectiveness) due to such contaminants. To compensate, at least in part, reduction in aging rate can be realized by reducing the feed charge rate (space velocity) or by increasing hydrogen partial pressure (a function of hydrogen concentration and total pressure). Each of these compensatory modifications is unattractive economically.

It has been recognized, therefore, that if substantial conversion could be realized in a true hydrocracking first stage, without excessive catalyst aging, the second stage hydrocracking catalyst and equipment requirements could be reduced substantially.

The present invention, therefore, is directed to a method and process for overcoming the shortcomings of prior practices, and particularly to maximizing gasoline production in a multi-stage hydrocracking process.

SUMMARY OF THE INVENTION

In accordance with the present invention, there is provided a process for converting selected gas oils with selected catalysts in a multi-stage hydrocracking process. A hydrocarbon fraction containing from about 1,000 to about 5,000 parts per million (ppm) organic nitrogen and having a boiling range within the approximate temperature range of from 400° to 800° F. is contacted, in the presence of added hydrogen, with certain hydrocracking catalysts which are substantially stable in the presence of organic nitrogen compounds. Such contact is with a liquid hourly space velocity of from about 0.5 to about 5 to provide a conversion per pass to naphtha having an end point of below about 390° F., of from about 20 to about 70 percent by weight. The resulting hydrocarbon product is fractionated to recover a naphtha boiling below about 390° F. and a gas oil or heavy naphtha boiling within the approximate range of 390° to 750° F. The gas oil is then hydrocracked, in the presence of added hydrogen and a hydrocracking catalyst under hydrocracking conditions, to convert the gas oil substantially completely to a naphtha having an end point below about 390° F. and lighter boiling products.

BRIEF DESCRIPTION OF THE DRAWING

Illustration of the invention is also provided with reference being made to the accompanying drawing, wherein:

The FIGURE shows a typical flow diagram of a preferred arrangement for practicing the invention.

DESCRIPTION OF SPECIFIC EMBODIMENTS

Hydrocarbon Feed

Hydrocarbon feed or charge stocks used herein are petroleum fractions having an approximate boiling range of from about 400° F. to about 800° F., and preferably to about 750° F. Thus, relatively small amounts of lower and higher boiling materials can be present without seriously affecting operation. The charge stocks contain from about 1,000 to about 5,000 parts per million (ppm) of organic nitrogen. Such fractions include straight run and catalytically cracked cycle stocks of light gas oil character, and mixtures thereof, particularly those derived from Californian crudes.

The process is particularly desirable for converting highly aromatic catalytic cycle stocks which themselves are relatively poor charge components for recycle in catalytic cracking. For example, the total of the aromatic and olefin content of such stocks can range from 35 to 75 or more percent by volume. Other types of stocks or blends thereof can also be used, including straight run and coker gas oils and the like, and blends thereof.

The aforesaid petroleum fractions can contain sulfur in amounts of up to about 5 percent by weight, since sulfur content up to this level is not critical in the process.

Charge stocks of the boiling range employed have inconsequential metal content. However, if the metal content of the charge should be abnormally high for some accidental occurrence in refinery operation, a small quantity of a catalyst other than the first-stage hydrocracking catalyst can be employed in advance of the latter catalyst. Suitable catalysts for this purpose include those with Group VIB–VIII hydrogenation components (e.g., cobalt molybdena) on amorphous supports such as alumina or alumina-silica.

HYDROCRACKING CATALYSTS

The catalyst in the first hydrocracking stage is of a critical nature, whereas the catalyst in the second hydrocracking stage can be any one of a number of known hydrocracking catalysts. A catalyst of the type used in the first stage can also be used in the second stage.

FIRST-STAGE CATALYSTS

The catalyst is comprised of both an amorphous acidic component and an acidic crystalline aluminosilicate in weight ratios of from about 20 to about 80 and from about 80 to about 20, respectively.

The amorphous component has an activity index (AI) of 25 or greater. Typical examples comprise representative catalytic cracking catalysts such as silica-alumina, silica-zirconia, silica-magnesia, silica-alumina-thoria, silica-alumina-fluoride, silica-zirconia-clay, acid treated montmorillonite clay and the like. A preferred component is silica-alumina.

The crystalline aluminosilicates have ordered internal structures with pore sizes available between 6 and 15 angstrom units. Examples of such zeolites are X, Y, L, ZSM–4, ZSM–5, mordenite and the like. A low alkali metal content is required; the sodium content of such zeolites should be less than about 2 percent by weight and preferably less than about 1 percent by weight. The sodium can be removed and replaced by any well known means such as ion-exchange. An example is given in U.S. Pat. No. 3,210,267. Suitable cations include the rare earths, calcium, magnesium, manganese, and ammonium (convertible to hydrogen ion on calcination). The rare earths are particularly preferred.

The crystalline aluminosilicates can be prepared by conventional methods. Another mode of preparing such material is by solid-solid exchange of clay with a sodium zeolite (e.g., sodium Y with clay as described in U.S. Pat. No. 3,391,088). Still another method is the conversion of clay with alkaline materials as described in U.S. Pat. No. 3,431,218. In these cases, the sodium limit of 2 percent by weight with less than 1 percent by weight preferred, refers to the exchangeable sodium of the crystalline components of the product.

The catalysts also include hydrogenation components which comprise any of the well-known hydrogenation components such as Group VI B-group VIII combinations, tungsten, molybdenum, and noble metals. Preferred are combinations of nickel-tungsten, cobalt-tungsten, nickel-molybdenum, and cobalt-molybdenum, with nickel-tungsten being illustrated in the following representative examples. Weight percent of nickel can vary from about 1 to about 10, with 2–7 preferred; weight percent of tungsten can vary from about 3 to about 30, with 5–20 preferred. Similar atomic ratios of 1:2 to 2:1 apply with cobalt and molybdenum. The hydrogenation components need not be the same on the amorphous and crystalline components of the catalysts.

These catalysts can be prepared by conventional methods. Particularly effective methods for catalysts of the preferred types are described in U.S. Pat. Nos. 3,173,854 and 3,304,254, and U.S. Pat. application Ser. No. 743,334, filed July 9, 1968.

The pertinent descriptions given of the catalysts in the aforesaid patents and patent application are incorporated herein by reference.

SECOND-STAGE CATALYSTS

The first stage effectively upgrades the product boiling above naphtha such that a wide variety of conventional hydrocracking catalysts can be used in the second stage. These include amorphous, crystalline aluminosilicates and mixed acidic components. Hydrogenation components include noble metals, nickel, Group VI B–VIII combinations, and the like.

The quantities of the effective hydrogenation components are the same as described in connection with the first-stage catalysts. Noble metal hydrogenation components are generally used in amounts of about 0.5–4 percent by weight. Examples include platinum-silica-zirconia, nickel-silica-alumina, nickel-tungsten-silica-zirconia-clay, palladium acid Y, platinum REX-alumina, etc. A mixed base catalyst such as the type described in Example 1A following is particularly effective.

HYDROCRACKING

As indicated above, the selected hydrocarbon fraction or fractions are cracked in contact with the aforementioned catalysts in the presence of added hydrogen in a plurality of stages. In the initial hydrocracking, operating conditions — and particularly temperature — are so selected as to provide for substantial conversion per pass to a naphtha product having an end point below about 390° F., of from about 20 to about 70 percent by weight, at relatively high space velocity and with low catalyst aging rates. In a second hydrocracking stage, the product boiling about about 390° F. is converted substantially completely to a naphtha product with an end point below about 390° F. and to lighter boiling products.

Operating conditions for the first-stage hydrocracking operation are provided below:

| | Broad | Preferred |
|---|---|---|
| Temperature, °F. | 675–875 | 725–825 |
| Pressure, psig | 1500–5000 | 2000–3000 |
| LHSV, v/v/hr. | 0.5–5 | 1.5–3 |
| Gas recycle, H₂ equivalent, scf/b | 3500–30,000 | 4000–10,000 |
| Conversion, wt. % | 20–70 | 30–60. |

Operating conditions are selected with the catalyst and charge stock so as to realize desirably low catalyst aging rates, of about 0.1° F. or less per day. Thus, the operating conditions recited above are modified in relation to the catalyst and/or charge employed. For example, increase in the nitrogen and condensed polycyclic aromatic content of the charge requires more severe operating conditions within the ranges so expressed, in order to maintain catalyst aging rates of less than about 0.1° F. per day. Further, there is a relationship between the operating conditions, as between hydrogen partial pressure (a function of pressure and gas recycle rate) and space velocity; an increase in hydrogen partial pressure makes possible an increase in permissable space velocity.

Operating conditions for the second-stage hydrocracking are not critical and can be varied widely, as indicated by the following conventional hydrocracking conditions:

| | Broad | Preferred |
|---|---|---|
| Pressure, psig | 1000–4000 | 1200–2000 |
| LHSV | 0.5–5 | 1–3 |
| Gas Recycle, H₂ equivalent, scf/b | 3500–30,000 | 4000–8000 |
| Temperature, °F. | 500–900 | 600–850 |

The most desirable charge for the second-stage hydrocracking operation is the first-stage product boiling above about 350°–400° F., however, lower initial boiling points are acceptable. The end point of the second-stage charge need not be the same as that of the first-stage product.

HYDROGEN

Pure hydrogen can be used. However, hydrogen of low purity, obtained by recycle or other hydrogenating process can be used, but it is recommended that the recycle hydrogen of the first stage be subjected to purification before use to reduce the amount of ammonia therein. The hydrogen can be circulated at a rate in the range of from 3,500 to about 30,000 standard cubic feet per barrel (scf/b) of hydrocarbon charge in the initial hydrocracking stage, as indicated above. Generally, there is a hydrogen consumption of at least about 1,000 SCF/B of charge in the initial hydrocracking stage.

REFORMING

The naphtha formed by the multi-stage hydrocracking operation can be reformed under customary reforming conditions. Suitable catalysts are platinum group metals with or without a halogen, particularly chlorine. Reforming conditions are typified by and include:

| | |
|---|---|
| Temperature, °F. | 900–980 |
| Pressure, psig | 500–1500 |
| LHSV | 0.5–3. |

ILLUSTRATIVE EXAMPLES

The following examples illustrate, and in no sense limit the invention.

EXAMPLE 1

1.-A. A catalyst of the mixed crystalline aluminosilicate-amorphous type required was prepared in the following manner.

An equal weight mixture of rare earth aluminosilicate X (containing approximately 28 weight percent of rare earth oxides and 0.8 weight percent of sodium), and silica-alumina (containing approximately 15 weight percent of alumina) is impregnated with a slurry of nickel nitrate and ammonium tungstate, and is extruded after adjusting to extrudable consistency with water and adding polyvinyl alcohol as an extrusion aid. The extrudate is dried at 250° F. and is calcined 3 hours at 1,000° F.

The catalyst has the following properties:

| | |
|---|---|
| Surface area, square meters per gram | 327 |
| Partial density, g/cc | 1.25 |
| Real density, g/cc | 3.26 |
| Packed density, g/cc | .7738 |
| Pore volume, cc/g | .495 |
| Pore diameter, A | 60 |
| Crushing strength, lbs/inch | 70 |

| Composition, wt % | | | |
|---|---|---|---|
| Nickel | 4.26 | Tungsten | 10.5 |
| Sodium | 0.44 | Silica | 51.6 |
| Rare earth oxides | 11.6 | Alumina | 17.6 |

1.-B. A crystalline aluminosilicate catalyst is prepared in the following manner.

A calcined rare earth aluminosilicate X is treated with a solution of 10 percent ammonium chloride, washed, dried, pelleted, and calcined 3 hours at 1,000° F. It is then vacuum impregnated with a chloroplatinic acid-sodium hydroxide solution containing 0.256 g sodium per gram of platinum, heated in a covered vessel 16 hours at 230° F., treated with nitrogen to 450° F. and reduced with hydrogen. The finished catalyst has 3.1 weight percent platinum and a surface area of 422 square meters per gram.

EXAMPLE 2

Charge stocks used in these studies are catalytic cycle stocks prepared in a commercial catalytic cracking unit. The have the following properties:

| | 2-A | 2-B | 2-C |
|---|---|---|---|
| Gravity, °API | 17.2 | 17.5 | 19.8 |
| Nitrogen, ppm | 2400 | 2400 | 700 |
| Hydrogen, wt. % | 10.13 | 10.12 | 10.62 |
| Sulfur, wt. % | 1.00 | 0.94 | 2.04 |
| Aniline No., °F. | 62.1 | 59.7 | — |
| Distillation D86 | | | |
| IBP | 443 | 437 | 482 |
| 5% | 474 | 470 | 631 |
| 10% | 493 | 484 | 643 |
| 30% | 520 | 517 | 667 |
| 50% | 551 | 550 | 686 |
| 70% | 593 | 589 | 701 |
| 90% | 648 | 649 | 728 |
| E.P. | 693 | 680 | 752 |
| % Recovered | 99.0 | 99.0 | 98.0 |
| Aromatics plus Olefins, vol. % | 65.4 | — | — |

EXAMPLE 3

A first stage operation is conducted with a crystalline aluminosilicate catalyst (3.1 weight percent platinum on REX). As shown in Examples 3F and 3G of the tabulated data below, there is marked aging equivalent to about 1° F./day loss in activity.

With the mixed base catalysts, however, excellent yields of high quality products are obtained as shown in Examples 3A through 3E.

With the mixed base catalysts at an average conversion of about 20 weight percent, the aging rate is approximately ≤ 0.05° F./day.

With the mixed base catalyst at an average conversion of about 41 weight percent, the aging rate is approximately ≤ 0.03° F./day.

EXAMPLE 3.—FIRST STAGE OPERATION

| | Type of catalyst | | | | | | |
|---|---|---|---|---|---|---|---|
| | Mixed base | | | | | Pt Rex | |
| Material-balance sample | 3A | 3B | 3C | 3D | 3E | 3F | 3G |
| Catalyst | 1-A | 1-A | 1-A | 1-A | 1-A | 1-B | 1-B |
| Charge | 2-B | 2-B | 2-A | 2-A | 2-A | 2-C | 2-C |
| Pressure, p.s.i.g. | 2,240 | 2,240 | 2,240 | 2,240 | 2,240 | 2,000 | 2,000 |
| Liquid hourly space veloc | 1.7 | 1.7 | 1.7 | 1.7 | 1.7 | 1.0 | 1.0 |
| Temp., °F., avg. catalyst | 737.6 | 737.7 | 737.8 | 768.7 | 768.3 | 741.6 | 741.4 |
| Hydrogen, s.c.f./bbl | 7,520 | 7,585 | 7,415 | 7,215 | 7,400 | 8,000 | 8,000 |
| Hydrogen consump., s.c.f./b. | 1,595 | 1,565 | 1,550 | 1,885 | 1,947 | 2,625 | 2,750 |
| Methane, wt. percent | .11 | .08 | .07 | .14 | .18 | | |
| Ethane, wt. percent | .14 | .14 | .14 | .14 | .18 | 3.5 | 3.0 |
| Propane, wt. percent | .46 | .46 | .38 | .26 | .40 | | |
| Isobutane, vol. percent | 0.7 | 0.7 | 0.8 | .80 | 1.00 | | |
| Normal butane, vol. percent | 0.9 | 0.8 | 0.9 | 1.9 | 2.1 | 6.7 | 5.7 |
| $C_5$-$C_6$, vol. percent | 3.7 | 3.4 | 3.6 | 1.7 | 2.1 | 5.2 | 4.9 |
| Heavy naphtha, vol. percent | 21.0 | 20.7 | 20.9 | 8.0 | 10.6 | 25.5 | 20.6 |
| Higher boiling prod., vol. percent | 84.1 | 83.7 | 83.7 | 36.8 | 36.7 | 54.3 | 46.2 |
| Product inspection: | | | | 66.3 | 64.0 | 37.3 | 47.2 |
| $C_6$ gravity, °API | 71.3 | 73.2 | 70.4 | 68.9 | 67.8 | 70.8 | 70.5 |
| $C_6$ octane, R+3 | | 96.2 | 95.7 | | | | 91.3 |
| Hvy. naph. grav., °API | 40.8 | 40.4 | 40.4 | 44.4 | 44.5 | 54.0 | 53.0 |
| Dist.: | | | | | | | |
| IBP | 213 | 215 | 223 | 218 | 217 | | 215 |
| 50% | 319 | 319 | 321 | 296 | 288 | | 267 |
| EP | 398 | 396 | 393 | 386 | 376 | | 370 |
| Octane, R+3 | 90.1 | 90.6 | 90.2 | 88.3 | | | 65.3 |
| Paraffins, vol. percent | 9.6 | 9.5 | 9.8 | 14.7 | | | 38.3 |
| Naphthenes, vol. percent | 55.3 | 54.2 | 55.0 | 55.0 | | | 44.5 |
| Aromatics, vol. percent | 35.9 | 36.3 | 36.3 | 30.3 | | | 17.2 |
| Higher boiling product: | | | | | | | |
| Gravity, °API | 26.8 | 26.7 | 24.6 | 29.7 | 29.8 | 39.4 | 36.9 |
| Dist. D86: | | | | | | | |
| IBP | 446 | | 458 | 444 | 440 | | |
| 50% | 526 | | 527 | 508 | 503 | | |
| EP | 666 | | 699 | 700 | 714 | | |
| Paraffins, vol. percent | | | 13.0 | | | | |
| Naphthenes, vol. percent | | | 41.1 | | | | |
| Aromatics, vol. percent | | | 45.9 | | | | |
| Nitrogen, p.p.m. | | 3 | | | 1 | | |
| Sulfur, p.p.m. | 47 | 60 | 60 | | 44 | | |
| Aniline No., °F | 104.3 | 102.6 | 101.5 | 108.2 | 111.0 | 175.5 | 178.0 |
| Weight percent conv | ←――21.0――→ | | | 39.0 | 41.0 | 67.0 | 57.6 |
| Aging rate, °F./day | ←――≤.05――→ | | | ←――≤.03――→ | | ←――1.0――→ | |

EXAMPLE 4

With reference to the FIGURE, a charge of 100 barrels of a hydrocarbon fraction having a boiling range of 440°–700° F., consisting of 100 percent of cycle stock from Fluid Catalytic Cracking and containing about 2,400 ppm of organic nitrogen and about 1 percent by weight of sulfur, is passed from line 10 to hydrocracking unit 11. Hydrogen in line 12, approximately 2,000 SCF/B required for reaction and losses, is mixed with the hydrocarbon fraction in line 10 and is so passed into unit 11. Unit 11 is operated at 2,900 psig inlet pressure and a LHSV of 1.7. A temperature of about 775° F. is required initially; this is raised periodically to compensate for a relatively small catalyst activity loss with time. The catalyst in unit 11 is the catalyst of EXAMPLE 1–A.

The product formed in unit 11 is removed via line 13 to an intermediate section of high pressure separator 14, which is operated at about 2,800 psig. Water in line 15 is injected into the product in line 13, in order to remove inorganic products such as ammonium hydrogen sulfide, ammonium sulfide and the like from separator 14 through line 16. Hydrogen in the product is removed overhead through line 17 for recycle to lines 12 and 10, and thence to unit 11, and for recycle directly as a quench to unit 11 via line 18. The gas in line 17 is so recycled to unit 11 to provide a net hydrogen rate of about 5,500 SCF/B of charge.

The substantially hydrogen-free product in separator 14 is passed through line 19, and is reduced in pressure to about 300 psi through a reducing valve (not shown) in line 19. The product is then passed to an intermediate section of low pressure separator 20. Gaseous products are removed from separator 20 through overhead line 21. The product remaining in separator 20 is passed through line 22 to an intermediate section of stabilizer 23, for removal of light hydrocarbons ranging from methane to isopentane as an overhead gaseous fraction via line 24.

The stabilized product in stabilizer 23 is comprised of approximately $C_5^+$ hydrocarbons. It is passed through line 25 to an intermediate section of fractionator 26. A light naphtha boiling approximately from isopentane to 180° F. end point is removed as an overhead product through line 27. A heavier naphtha with an ASTM boiling range of approximately 225°–390° F. is removed from fractionator 26 through line 28. A bottoms product is removed from fractionator 26 through line 29 and is passed to a second hydrocracking unit 30.

In the first stage operation, there are obtained from 100 barrels of charge:

| | |
|---|---|
| 4.0 barrels | butanes |
| 10.3 barrels | light naphtha |
| 36.6 barrels | heavy naphtha |
| 64.6 barrels | higher boiling |
| 115.5 barrels | Total |

This represents a conversion of about 35.4 percent by volume to products boiling below about 390° F.

Added to the higher boiling fraction in line 29 is hydrogen from line 31. Hydrogen used for reaction and make up totals about 1,700 SCF/B. The recycle gas rate in line 31 is about 4,400 SCF/B. The catalyst in unit 30 is the same as that in unit 11. Unit 30 is operated at approximately 1.5 LHSV with about 60 percent conversion per pass to products boiling below about 390° F. Inlet pressure is about 1,510 psig with a temperature of about 625° F.

The entire reaction product from unit 30 is removed from unit 30 through line 32 to high pressure separator 33. Hydrogen is separated from the product in separator 33 and is recycled through line 31 to line 29 and hydrocracking unit 30, and, in part directly as a quench to unit 30 through line 34. Hydrocarbon product in separator 33 is passed through line 36 and is mixed with first-stage liquid product in line 19 for passage to separator 20, stabilizer 23 and fractionator 26.

In the two stages, there are obtained from each 100 barrels of charge:

350 lbs hydrogen sulfide equivalent
    95 lbs ammonia equivalent
    50 lbs methane
    120 lbs ethane
    590 lbs propane.

Other products are:

9.1 barrels of isobutane
    5.1 barrels of normal butane
    27.8 barrels of light naphtha
    86.8 barrels of heavy naphtha
    128.8 barrels Total The light naphtha in line 27 has an API gravity of 82.6 and an octane number (research with 3 ml TEL) of 98.8

The heavy naphtha in line 28 has an API gravity of 44.9. It has an octane number (research method with 3 ml TEL) of 85.9 and is comprised volumetrically of 21 percent paraffins, 57 percent naphthenes and 22 percent aromatics. It is thus an excellent reformer charge.

The heavy naphtha in line 28 is passed to reformer 37, as is hydrogen in line 38, and is reformed at 550 psig over a platinum-alumina catalyst at a hydrogen to hydrocarbon recycle ration of 12/1 at 1 space velocity to give a $C_5^+$ reformate of 102 octane number (research method plus 3 ml of TEL). The resulting reformate product is removed from reformer 37 through line 39, and is sent to conventional separating and fractionating units (not shown).

The combined hydrocracking-reforming yields are as follows (per 100 barrels of original charge):

Hydrogen consumption 2200 SCF/B
    350 lbs hydrogen sulfide equivalent
    395 lbs ammonia equivalent
    295 lbs methane
    515 lbs ethane
    1240 lbs propane 10.2 barrels of isobutane
    6.6 barrels of normal butane
    27.8 barrels of light naphtha
    76.2 barrels of $C_5$+ reformate
    120.8 barrels Total The combined $C_5^+$ product of 104.0 volume percent has an octane number of 101.2 (research method + 3 ml. TEL).

As shown, the two-stage hydrocracking sequence can be combined advantageously with reforming. Hydrogen produced in the reforming step can be used in the hydrocracking stages or in other hydrogen processing operations. It is also within the scope of this invention to reform naphtha from only one of the hydrocracking stages; for example, the higher octane first-stage naphtha can be used without reforming and only the second-stage naphtha can be used without reforming reformed. The charge for reforming generally will comprise naphtha boiling from about $C_7$ hydrocarbons to 390° F. ASTM end point and such a charge can also be split into multiple fractions for reforming.

As a modification of the processing system shown in the FIGURE, the product in line 29 can be charged to a fractionator (not shown) in order to maximize and remove jet fuel therefrom and the balance of the product from line 29 can then be charged to hydrocracking unit 30. Alternately, using similar fractionation, but for higher quality jet fuel, the product from separator 14 removed through line 19 can be charged, with or without removal of lighter components, to hydrocracking unit 30.

The rare earth mixtures of Examples 1A and 1B consist principally of cerium, lanthanum, praseodymium and neodymium, together with smaller amounts of other rare earths.

What is claimed is:

1. A method for converting a hydrocarbon charge of low API gravity boiling below about 800° F. having combined organic nitrogen compounds in amounts ranging from about 1,000 to 5,000 ppm to form naphtha boiling range product which comprises contacting said nitrogen-containing hydrocarbon charge with a mixed base hydrocracking catalyst comprising an acidic crystalline aluminosilicate cracking component containing substantial amounts of rare earth oxides in combination with an acidic amorphous cracking component having an activity index of about 25 or greater in a weight ratio of from about 20 to 80 parts of one cracking component to the other, said cracking base provided with non-noble metal hydrogenation-dehydrogenation activity selected from the hydrogenation components of Group VIB and Group VIII and effecting said conversion of said hydrocarbon charge with said hydrocracking catalyst under hydrocracking conditions selected to produce naphtha boiling range product at a conversion level restricted to within the range of 20 to about 70 percent by weight whereby the aging rate of the catalyst is maintained not to exceed about 0.1° F. per day.

2. The method of claim 1 wherein the conversion per pass to naphtha boiling product is restricted to within the range of about 30 to about 50 percent by weight.

3. The method of claim 1 wherein the catalyst comprises a rare earth exchanged X-type zeolite and a silica-alumina matrix.

4. The method of claim 1 wherein the hydrogenation-dehydrogenation component comprises nickel or cobalt and molybdenum or tungsten.

5. The method of claim 1 wherein the hydrogenation component is a mixture of nickel and tungsten and the total catalyst composition contains between about 1 and about 20 weight percent of nickel and between about 5 and 40 weight percent of tungsten.

6. The method of claim 1 wherein said naphtha product is subjected to catalytic desulfurization prior to catalytic reforming.

* * * * *